H. B. WALKER.
SWIVEL SOCKET FOR OIL WELLS.
APPLICATION FILED JAN. 7, 1916.
1,191,250.
Patented July 18, 1916.
FIG. 1
FIG. 2
FIG. 3
FIG. 4
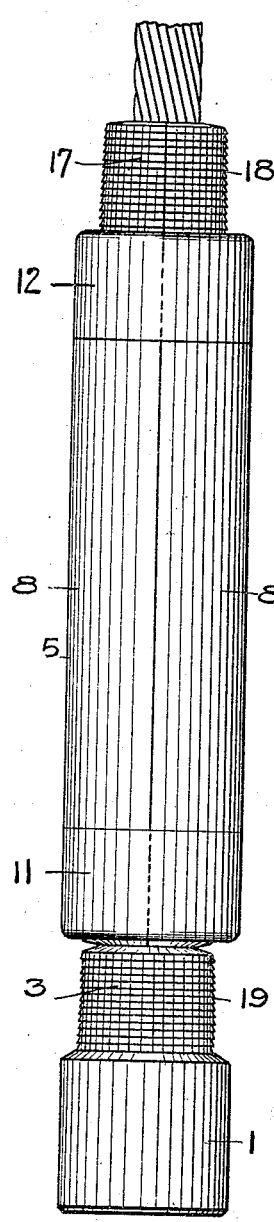
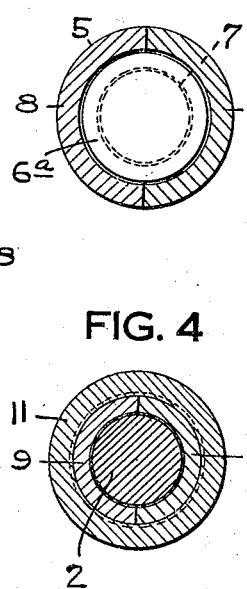
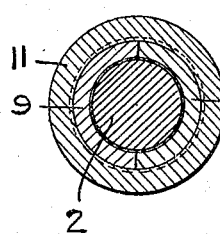
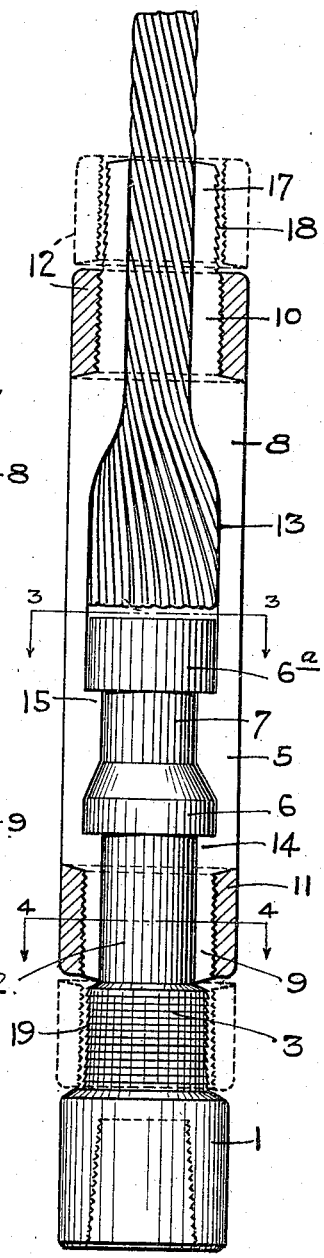
WITNESSES
J. R. Keller
John F. Will
INVENTOR
Henry B. Walker
by Kay Totten & Powell
attys

UNITED STATES PATENT OFFICE.

HENRY B. WALKER, OF LANCASTER, OHIO.

SWIVEL-SOCKET FOR OIL-WELLS.

1,191,250.  Specification of Letters Patent.  Patented July 18, 1916.

Application filed January 7, 1916. Serial No. 70,869.

*To all whom it may concern:*

Be it known that I, HENRY B. WALKER, a citizen of the United States, and resident of Lancaster, in the county of Fairfield and State of Ohio, have invented a new and useful Improvement in Swivel-Sockets for Oil-Wells; and I do hereby declare the following to be a full, clear, and exact description thereof.

In the use of wire ropes for oil well pumps, it is desirable to have a swivel connection between the wire rope and the pumping mechanism to permit the twisting of the wire rope. For this purpose it has been usual to locate the swivel at the end of the wire rope and above the weights used for holding it taut, which are located between it and the pump proper operating within the pumping barrel.

In the swivels now in use, as the usual diameter of the sockets is only about one and five-eighths (1⅝) inches, it is difficult to obtain a sufficient bearing surface for the different parts of the swivel. The rope itself is socketed in the upper portion of a bowl and the swivel connection is formed of a collar fitting around a mandrel formed on the lower or socket portion of the swivel, and having an upper threaded end with which a nut engages, which forms the swivel portion within the socket and has usually a bearing surface of only one-eighth (⅛) inch.

The object of my invention is to provide a swivel rope socket connection in which the bearing surface can be much increased and in which the parts can be easily removable and taken apart. It comprises, generally stated, a socket or union provided with a mandrel having a series of collars, and a longitudinally divided bowl portion having a rope socket cavity in its upper portion, and having a series of corresponding inwardly projecting collars and an annular seat said bowl portion having threaded ends, and nuts engaging said ends of the bowl to secure the longitudinally divided bowl around the rope and mandrel, so providing for connection with the rope and for large bearing faces between the swivel portions, increasing the life and efficiency of the swivel, while providing for easy opening of the swivel for repair and removal and replacement of the rope.

In the accompanying drawings, Figure 1 is a side view of my improved swivel; Fig. 2 is a view partly in section with one portion of the bowl removed, showing means for separating and assembling the swivel; Fig. 3 is a cross section on the line 3—3, Fig. 2, and Fig. 4 is a cross section on the line 4—4, Fig. 2.

The swivel may be employed with any suitable rope connection, but is very advantageous in connection with oil and like wells, as above described. It has the coupling member 1 having a threaded seat or like means for coupling it to the other tools, and formed integral therewith is the mandrel 2, which is connected with it by means of the neck 3, which is preferably reduced, being of smaller diameter than the socket, so as to provide for the reception of the nut 11 connecting together the lower ends of the bowl member 5. The mandrel member 2 forms the lower member of the swivel proper and has a series of two or more collars 6, 6ª with reduced neck or necks 7 between them. The upper swivel member is formed of a bowl 5 divided longitudinally into two or more sections 8, 8, and has at its ends the portions 9, 10, which are held together by surrounding rings or collars, such, for example, as nuts 11, 12, which engage said portions 9, 10, which are preferably threaded for that purpose. In the upper part of this bowl is the rope socket or seat 13, and below the same are the inwardly projecting swivel collar portions 14, 15, which project under the collars 6, 6ª of the mandrel member 2, so forming the swivel connection.

The mandrel member 2 and bowl member 5 may be made of any desired length, and with any number of swivel collar connections and as they are formed in the portion of the bowl having the largest diameter, the collars may be made of such width as to give a strong bearing between the mandrel member and the bowl member, and provide for all the bearing surface necessary for strength and wear. To this end the rings and collars forming the swivel may be made of any diameter desired. It will be noticed that the neck 3 of the union or socket member 1 is of smaller diameter than the threaded portion 9 and nut 4. This is made for the purpose of assembling the swivel, so that the nut or ring 4 can be unscrewed or passed down around the neck 3, as shown in dotted lines. In like manner, the nut or ring 12 may be screwed or passed upwardly from the threaded portion of the upper end of the bowl, so that the bowl may be separated for repair or replacement. When in use in oil wells in case the rope should pull out of the upper bowl member or rope socket 5, or in case the lower mandrel member 2 should break and it is necessary to use fishing tools to grip and catch the lost portions, the bowl member 5 is carried up above its threaded connection 10 with the nut 12 and has the annular projection 17 of smaller diameter than the portion 10, which projection is preferably toothed as at 18 to provide for easy engagement with the fishing tool or socket. In like manner the reduced neck portion 3 of the mandrel member 2 is also provided with a toothed face 19 for engagement with the fishing tool.

In assembling the swivel the end of the rope is loosened and spread apart or knotted in the bowl and Babbitt or like metal cast within and around it so as to form the enlarged end for engagement with the swivel. This may be done in a separate mold or by the use of the bowl itself. The nut 12 is slipped over the end of the rope and the nut 4 is slipped down over the mandrel and around the neck 3 and two or more sections 8, 8, of the bowl member 5 are then placed in position around the end of the rope and the mandrel member 2, and the nuts 4 and 12 are screwed onto the bowl and firmly seated, so assembling the rope socket. For use, the socket or lower member is connected to the lower string of tools leading to the pump. During use the broad swivel bearing faces of the collars 6, 6ª and the inwardly projecting collars 14, 15 of the swivel members provide full wearing surfaces and a strong connection between the parts of the swivel, while in the operation of pumping full freedom for the turning of the rope or of the pumping valves below is given. In case the rope pulls out of its seat and it is necessary to fish for the tubes within the tubing, the projecting portion 17 provides a proper surface for engagement. In case the mandrel of the swivel should break, the neck portion 3 provides a suitable place for engagement with the fishing tools.

To separate the two parts, it is only necessary to screw down the nut 4 around the neck 3 and screw up the nut 12 from the threaded portion 10 when the longitudinally divided members of the bowl may be separated, and provision is thus made for reinserting the rope or for other necessary repair.

The parts of the swivel may be changed in proportion and shape without departing from my invention.

What I claim is:

1. In a swivel rope socket, the combination of a mandrel member having outwardly projecting collars and a longitudinally divided bowl member having corresponding inwardly projecting collars, and means having integral fastening means engaging the bowl member to secure the sections thereof together.

2. In a rope socket, the combination of a mandrel member having a coupling at its base and outwardly projecting collars and a longitudinally divided bowl member having corresponding inwardly projecting collars, and above the same a rope socket cavity and means having integral fastening means engaging the bowl member to secure the sections thereof together.

3. In a swivel rope socket, the combination of a mandrel member having outwardly projecting collars and a longitudinally divided bowl member having corresponding inwardly projecting collars, and nuts engaging the ends of the bowl member to secure the sections thereof together.

4. In a rope socket, the combination of a mandrel member having a coupling at its base and outwardly projecting collars and a longitudinally divided bowl member having corresponding inwardly projecting collars, and above the same a rope socket cavity and nuts engaging the ends of the bowl member to secure the sections thereof together, the mandrel member having a neck portion between the coupling and mandrel body of smaller diameter than the nut uniting the sections of the bowl member and of as great length as said nut.

5. In a rope socket, the combination of a mandrel member having a coupling at its base and outwardly projecting collars and a longitudinally divided bowl member having corresponding inwardly projecting collars, and above the same a rope socket cavity and nuts engaging the ends of the bowl member to secure the sections thereof together, the upper ends of the bowl member sections having a reduced portion of less diameter than the upper nut uniting said sections and projecting above the same when the socket is assembled to provide for fishing purposes.

6. In a swivel rope socket, the combination of a mandrel member having outwardly projecting collars and a longitudinally divided bowl member having corresponding inwardly projecting collars, and means having their outer surfaces flush with the exterior of the body of the bowl member and engaging said member to secure the sections thereof together.

In testimony whereof, I the said HENRY B. WALKER, have hereunto set my hand.

HENRY B. WALKER.

Witnesses:
H. E. WAGNER,
L. H. DE BRELL.

Copies of this patent may be obtained for five cents each, by addressing the "Commissioner of Patents, Washington, D. C."